United States Patent
Keck (10) Patent No.: US 10,974,656 B2
(45) Date of Patent: Apr. 13, 2021

(54) PICKUP TRUCK TAILGATE STORAGE CARRIER AND RESTING SURFACE

(71) Applicant: Theodore J. Keck, Los Angeles, CA (US)

(72) Inventor: Theodore J. Keck, Los Angeles, CA (US)

(*) Notice: Subject to any disclaimer, the term of this patent is extended or adjusted under 35 U.S.C. 154(b) by 0 days.

(21) Appl. No.: 16/870,787

(22) Filed: May 8, 2020

(65) Prior Publication Data

US 2020/0353872 A1 Nov. 12, 2020

Related U.S. Application Data

(60) Provisional application No. 62/846,470, filed on May 10, 2019.

(51) Int. Cl.
  *B60R 9/06* (2006.01)
  *B60P 1/43* (2006.01)
  *B60R 11/00* (2006.01)

(52) U.S. Cl.
  CPC ............. *B60R 9/065* (2013.01); *B60P 1/43* (2013.01); *B60R 2011/004* (2013.01); *B60R 2011/0059* (2013.01); *B60R 2011/0075* (2013.01); *B60R 2011/0084* (2013.01); *B60R 2011/0085* (2013.01)

(58) Field of Classification Search
  CPC ..... B60R 9/065; B60R 2011/0085; B60P 1/43
  USPC ................................................ 224/403, 404
  See application file for complete search history.

(56) References Cited

U.S. PATENT DOCUMENTS

| 2,784,027 | A | | 3/1957 | Temp |
| 4,266,821 | A | | 5/1981 | Gillet |
| 4,756,457 | A | * | 7/1988 | Polk ........................ B60R 9/065 224/509 |
| 4,915,437 | A | | 4/1990 | Cherry |
| 5,125,710 | A | | 6/1992 | Ginelo |
| 5,215,346 | A | * | 6/1993 | Reitzloff ............ B62D 33/0273 296/37.6 |
| 5,273,335 | A | | 12/1993 | Belnap et al. |
| 5,498,049 | A | | 3/1996 | Schlachter |

(Continued)

FOREIGN PATENT DOCUMENTS

WO WO2006025826 3/2006

OTHER PUBLICATIONS

Copenheaver, Blaine R.; International Search Report and Written Opinion; dated Jul. 13, 2020; 10 pages; Alexandria, VA.

*Primary Examiner* — Justin M Larson
(74) *Attorney, Agent, or Firm* — Stetina Brunda Garred and Brucker (57) ABSTRACT

A storage carrier for use with a tailgate of a vehicle. The storage carrier includes a hinge mechanism attachable to an outer face of the tailgate. The storage carrier includes a cabinet including first, opposing second and rear sides. The first side has a resting surface. The cabinet is attached a hinge mechanism adjacent the second and rear sides. The cabinet pivots between stored and deployed positions. In the stored position the first side is disposed adjacent the outer face and generally disposed in a vertical orientation with the tailgate in a closed position. In the deployed position the first side is generally disposed in a horizontal orientation with the resting surface being exposed away from the outer face with the tailgate in a closed position. The storage carrier further includes a cabinet recess formed in the cabinet.

19 Claims, 9 Drawing Sheets

(56) References Cited

U.S. PATENT DOCUMENTS

| | | | |
|---|---|---|---|
| 5,518,158 A | 5/1996 | Matlack | |
| 5,575,521 A * | 11/1996 | Speis | B62D 33/0273 |
| | | | 108/44 |
| 5,649,734 A * | 7/1997 | Speis | B62D 33/0273 |
| | | | 108/44 |
| 5,730,344 A * | 3/1998 | Mauch | B60P 3/36 |
| | | | 224/402 |
| 5,788,311 A * | 8/1998 | Tibbals | B62D 33/0273 |
| | | | 296/26.11 |
| 5,853,116 A * | 12/1998 | Schreiner | B60R 9/00 |
| | | | 224/404 |
| 6,116,676 A | 9/2000 | Edwards | |
| 6,641,190 B2 | 11/2003 | Kirchhoff | |
| 6,695,375 B1 * | 2/2004 | May | B60R 9/00 |
| | | | 224/281 |
| 6,752,302 B2 | 6/2004 | Anton | |
| 6,764,123 B1 * | 7/2004 | Bilyard | B60P 1/435 |
| | | | 296/61 |
| 6,811,067 B2 * | 11/2004 | Muizelaar | B62D 33/027 |
| | | | 224/404 |
| 6,923,354 B2 | 8/2005 | Axelson | |
| 7,111,884 B2 * | 9/2006 | Johnson | B60P 3/14 |
| | | | 296/26.1 |
| 7,309,093 B2 * | 12/2007 | Ward | B60P 3/14 |
| | | | 206/349 |
| 7,500,706 B2 | 3/2009 | Anderson et al. | |
| 7,628,439 B1 | 12/2009 | Strong | |
| 7,699,378 B2 | 4/2010 | Smith et al. | |
| 7,905,532 B2 | 3/2011 | Johnson | |
| 8,123,271 B1 * | 2/2012 | Wimberley | B60N 2/3095 |
| | | | 296/63 |
| 8,281,967 B2 * | 10/2012 | Evans | B60R 9/00 |
| | | | 224/404 |
| 8,348,325 B2 | 1/2013 | Hausler et al. | |
| 8,528,976 B2 * | 9/2013 | Wimberley | B60N 2/22 |
| | | | 297/352 |
| 8,925,777 B1 * | 1/2015 | Casucci | B60R 9/065 |
| | | | 224/404 |
| 9,308,947 B2 | 4/2016 | Kmita et al. | |
| 9,821,720 B1 * | 11/2017 | McCauley | B60P 7/00 |
| 9,889,786 B1 * | 2/2018 | Stojkovic | B60P 1/4471 |
| 9,926,018 B2 * | 3/2018 | Spahn | B62D 33/0273 |
| 9,956,996 B2 * | 5/2018 | Astrike | B62D 33/03 |
| 10,029,598 B2 * | 7/2018 | Keck | A01K 1/035 |
| 10,065,567 B2 * | 9/2018 | Garrison | B62D 33/02 |
| 10,328,860 B2 * | 6/2019 | Lewis | B60R 7/02 |
| 10,358,072 B2 * | 7/2019 | Wereski | B62D 33/03 |
| 10,596,975 B1 * | 3/2020 | Quintus | F16C 11/045 |
| 10,793,046 B1 * | 10/2020 | Jenkins | B60P 1/4485 |
| 10,793,087 B2 * | 10/2020 | Jarvis | B60R 9/065 |
| 10,800,341 B2 * | 10/2020 | Merryman | B60R 9/065 |
| 10,889,223 B2 * | 1/2021 | Pascarella | B60R 9/06 |
| 2002/0109369 A1 * | 8/2002 | Boomhower | B60N 2/305 |
| | | | 296/63 |
| 2003/0000980 A1 | 1/2003 | Muizelaar et al. | |
| 2003/0189353 A1 * | 10/2003 | Moore | B60R 11/06 |
| | | | 296/37.6 |
| 2005/0264048 A1 * | 12/2005 | Collins | B60N 2/3095 |
| | | | 297/188.01 |
| 2007/0152002 A1 * | 7/2007 | Dollar, Jr. | B60R 11/00 |
| | | | 224/404 |
| 2008/0190977 A1 | 8/2008 | Estabrook | |
| 2012/0325877 A1 | 12/2012 | Franks | |
| 2013/0019417 A1 | 1/2013 | Kenny | |
| 2020/0223372 A1 * | 7/2020 | Aplin | B60R 11/06 |
| 2020/0353872 A1 * | 11/2020 | Keck | B60R 9/065 |

* cited by examiner

PICKUP TRUCK TAILGATE STORAGE CARRIER AND RESTING SURFACE

CROSS-REFERENCE TO RELATED APPLICATIONS

The present application is a non-provisional patent application of and claims priority to provisional U.S. Patent App. Ser. 62/846,470, entitled PICKUP TRUCK TAILGATE STORAGE CARRIER AND RESTING SURFACE, filed on May 10, 2019, the entire contents of which are incorporated herein by reference.

STATEMENT RE: FEDERALLY SPONSORED RESEARCH/DEVELOPMENT

Not Applicable

BACKGROUND OF THE INVENTION

The invention relates generally to a carrier system, and more particularly to a tailgate storage carrier and resting surface used with a pickup truck.

Pickup trucks have a tailgate at the rear of the vehicle which rotates from a closed secure position perpendicular to the ground to an open resting position parallel to the ground. When the tailgate is in the open position parallel to the ground it is possible to access the pickup truck cargo bed from the rear of the vehicle. When the tailgate is in the closed position perpendicular to the ground it prevents cargo in the cargo bed from sliding out of the cargo bed as a result of forces that are generated during normal driving conditions.

When using a pickup truck for any number of functional purposes it can be very beneficial to have a storage carrier or storage carriers mounted on the vehicle which can be used to store and carry gear, equipment, tools, paperwork, files, plans or any number of things. When using a pickup truck for any number of functional purposes it can also be very beneficial to have an external resting surface or working surface mounted on the vehicle which can be used to assist in any number of tasks.

There are several difficulties that develop when selecting a location on a pickup truck to mount a storage carrier or resting surface. A first difficulty when selecting a location on a pickup truck to mount a storage carrier or resting surface is finding a location that does not limit the space, access, and usability of the cargo bed of the pickup truck. Most storage carriers are mounted somewhere inside the cargo bed of the pickup truck which restricts the available space within the cargo bed for other cargo, restricts access to the cargo bed, and limits the full usability of the cargo bed.

A second difficulty when selecting a location on a pickup truck to mount a storage carrier or resting surface is finding a location that does not increase the total height of the pickup truck. Many times storage carriers can be mounted on the roof of the pickup truck. However, rooftop carriers can significantly increase the total height of the pickup truck which can limit the usability of the pickup truck. A third difficulty when selecting a location on a pickup truck to mount a storage carrier or resting surface is finding a location that very quick, easy, and simple to access. Many times storage carriers mounted in the cargo bed area of the pickup truck or the roof of the pickup truck are difficult and time consuming to access which greatly restricts the usability of the storage carrier. It adds tremendous utility and functionality to the storage carrier if it is possible to quickly and easily access the storage carrier because speed of access and ease of use are a huge benefit to the operator.

A fourth difficulty when selecting a location on a pickup truck to mount a storage carrier or resting surface is finding a location that does not interfere with the normal functionality of the vehicle. Many times, a storage carriers presence can interfere with the normal operating functionality of the vehicle which can therefore limit the full functionality of the vehicle.

For the purposes of this application, a pickup truck is used to refer to any manner of vehicle that includes a cargo bed and a rear tailgate or door, and may include pickup type trucks, cargo trucks, vans, minivans, sport utility vehicles (SUVs), hatchbacks, delivery vans, utility vehicles, work trucks, and station wagons are just a few examples of vehicles with cargo beds and that may include a rear tailgate. Cargo beds are also similarly present in many non-motorized vehicles, such as trailers and haulers, that may include a rear tailgate.

In view of the foregoing, there is a need in the art for a improved storage carrier or resting surface to be integrated for use with a pickup truck.

BRIEF SUMMARY

Briefly and in general terms, an aspect of the present invention is directed to a storage carrier for use with a tailgate of a vehicle. The tailgate includes an outer face and an opposing inner face, and a top edge disposed between the outer face and the inner face and an opposing bottom edge disposed between the outer face and the inner face. The tailgate is pivotally connected to a vehicle body generally along the bottom edge. The tailgate has a closed position with the outer face generally vertically oriented and facing away from the vehicle. The tailgate has an open position with the outer face generally horizontally oriented. The storage carrier includes a hinge mechanism sized and configured to be attachable to the outer face of the tailgate. The storage carrier further includes a cabinet including a first side, a second side opposite the first side, and a rear side disposed between and generally orthogonal to the first and second sides. The first side has a resting surface facing away from the cabinet. The cabinet is attached to the hinge mechanism adjacent the second and rear sides. The cabinet is sized and configured to pivot between a stored position and a deployed position. In the stored position the first side is disposed adjacent the outer face and generally disposed in a vertical orientation with the tailgate in a closed position and the hinge mechanism attached to the outer face. In the deployed position the first side is generally disposed in a horizontal orientation with the resting surface being exposed away from the outer face with the tailgate in a closed position and the hinge mechanism attached to the outer face. The storage carrier further includes a cabinet recess formed in the cabinet and generally bounded by the first, second, and rear sides.

It is contemplated that the storage carrier is configurable so that the contents of the carrier can be easily accessed whether the tailgate is in the closed position perpendicular to the ground or the tailgate is in the open position parallel to the ground. When the tailgate is in the closed position perpendicular to the ground the storage carrier functions as a resting surface or working surface which adds tremendous utility and functionality to the vehicle. Further, the storage carrier mounted on the rear side of the tailgate does not interfere with the normal operating functionality of the vehicle and only adds additional utility and functionality to the vehicle.

According to various embodiments, the cabinet may be attached to the hinge mechanism adjacent the first side. The storage carrier may further include a mounting plate attached to the hinge mechanism. The mounting plate may be sized and configured to be attachable to the outer face of the tailgate, and the hinge mechanism may be attachable to the outer face via the mounting plate. In the stored position the first side may be disposed adjacent the outer face when the mounting plate is attached to the outer face. In the stored position the resting surface may be against the mounting plate. The storage carrier may further include an attachment portion that is connected to the mounting plate and positionable over the top edge of the tailgate when the mounting plate is attached to the outer face.

Further, the storage carrier may include a drawer having a front panel with a front surface facing away from the drawer. The drawer may be positionable within the cabinet recess and sized and configured to slide into and out of the cabinet recess. The front surface may be generally disposed in a horizontal orientation with the tailgate in a closed position. The drawer may be sized and configured to slide into and out of the cabinet recess, the front surface being generally disposed in a horizontal orientation with the tailgate in a closed position. The drawer may be sized and configured to slide into and out of the cabinet recess in directions towards and away from the rear side. The drawer may be sized and configured to slide into and out of the cabinet recess in directions parallel the rear side. The cabinet may include a third side and a fourth opposite the third side, and the third and fourth sides may be orthogonal to the first, second and rear sides. The cabinet may further include a lid disposed opposite the rear side attachable at the first and second sides for enclosing the cabinet recess. The cabinet recess may define a single compartment or more than one compartment. The storage carrier may further include a table panel having a working surface. The table panel is positionable within the cabinet recess. The table panel may be sized and configured to slide into and out of the cabinet recess with the working surface being generally disposed in a horizontal orientation with the tailgate in a closed position and the cabinet in the deployed position. The table panel may be sized and configured to slide into and out of the cabinet recess with the working surface being generally disposed in a horizontal orientation with the tailgate in the open position and the cabinet in the closed position.

According to another aspect of the invention, there is provided a tailgate for use with a vehicle body. The tailgate includes tailgate body having an outer face and an opposing inner face, a top edge disposed between the outer face and the inner face, and a bottom edge disposed opposite the top edge and disposed between the outer face and the inner face. The tailgate body is pivotally connectable to the vehicle body generally along the bottom edge. The tailgate has a closed position with the outer face generally vertically oriented and facing away from the vehicle when the tailgate being pivotally connected to the vehicle body. The tailgate has an open position with the outer face generally horizontally oriented when the tailgate being pivotally connected to the vehicle body. The tailgate further includes a hinge mechanism disposed along the outer face of the tailgate. The tailgate further includes a cabinet including a first side, a second side opposite the first side, and a rear side disposed between and generally orthogonal to the first and second sides. The first side has a resting surface facing away from the cabinet. The cabinet is attached to the hinge mechanism adjacent the second and rear sides. The cabinet is sized and configured to pivot between a stored position and a deployed position. In the stored position the first side is disposed adjacent the outer face and generally disposed in a vertical orientation with the tailgate in a closed position. In the deployed position the first side is generally disposed in a horizontal orientation with the resting surface being exposed away from the outer face with the tailgate in a closed position. The tailgate further includes a cabinet recess formed in the cabinet and generally bounded by the first, second, and rear sides.

According the various embodiments, the tailgate body may include a tailgate storage recess formed in the tailgate body and generally bounded by the outer face, the inner face, the top edge and the bottom edge. The tailgate body may further include has a tailgate opening adjacent the top edge and extending to the tailgate storage recess. The tailgate body may include a tailgate lid disposed adjacent the top edge sized and configured to extend across the tailgate opening between the inner face and the outer face with the lid in a closed position for enclosing the tailgate storage recess. The tailgate body may include a tailgate lid disposed adjacent the top edge sized and configured to extend across the tailgate opening from the inner to adjacent the second side with the tailgate lid in the closed position and the and cabinet in the stored position for enclosing the tailgate storage recess. The tailgate may include a ramp positionable in the tailgate storage recess. The ramp may be sized and configured to be extendable between the tailgate in the open position and a ground surface upon which a vehicle of the vehicle body is resting upon.

The features and advantages of the invention will be more readily understood from the following detailed description that should be read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
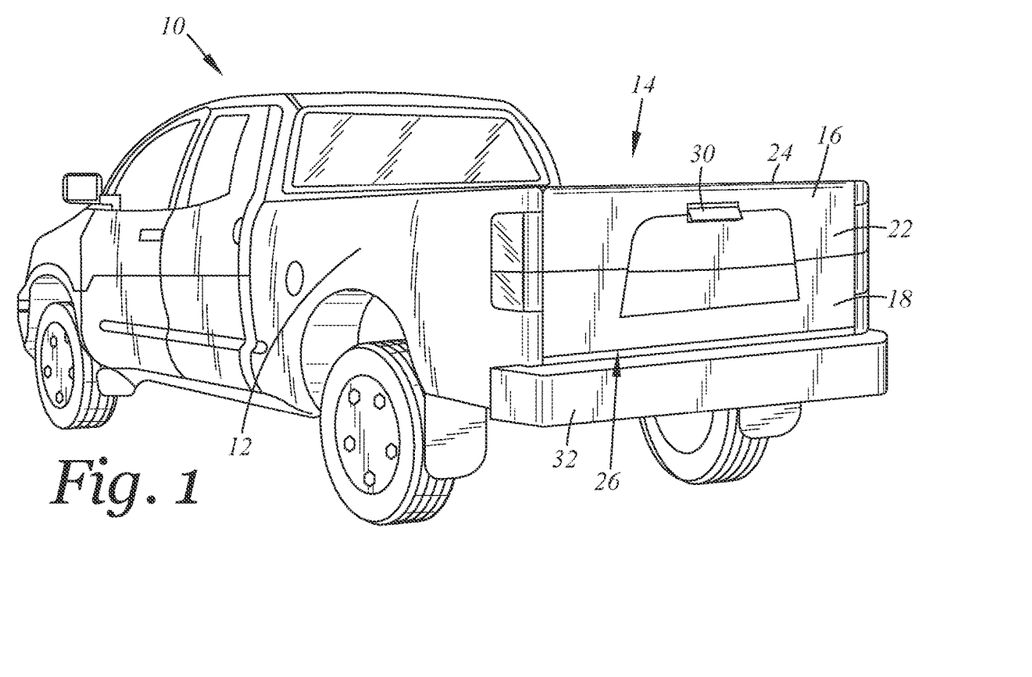
FIG. 1 is a perspective view of an exemplary vehicle having a tailgate suitable for use with a storage carrier according to an aspect of the present invention.

Referring now in more detail to the exemplary drawings for purposes of illustrating embodiments of the invention, wherein like reference numerals designate corresponding or like elements among the several views, there is shown in FIG. 1 a vehicle 10. The vehicle 10 includes a vehicle body 12 with a cargo bed 14. The vehicle body 12 includes a tailgate 16 that can be used to more easily load and unload cargo from the cargo bed 14.

Figure 2:
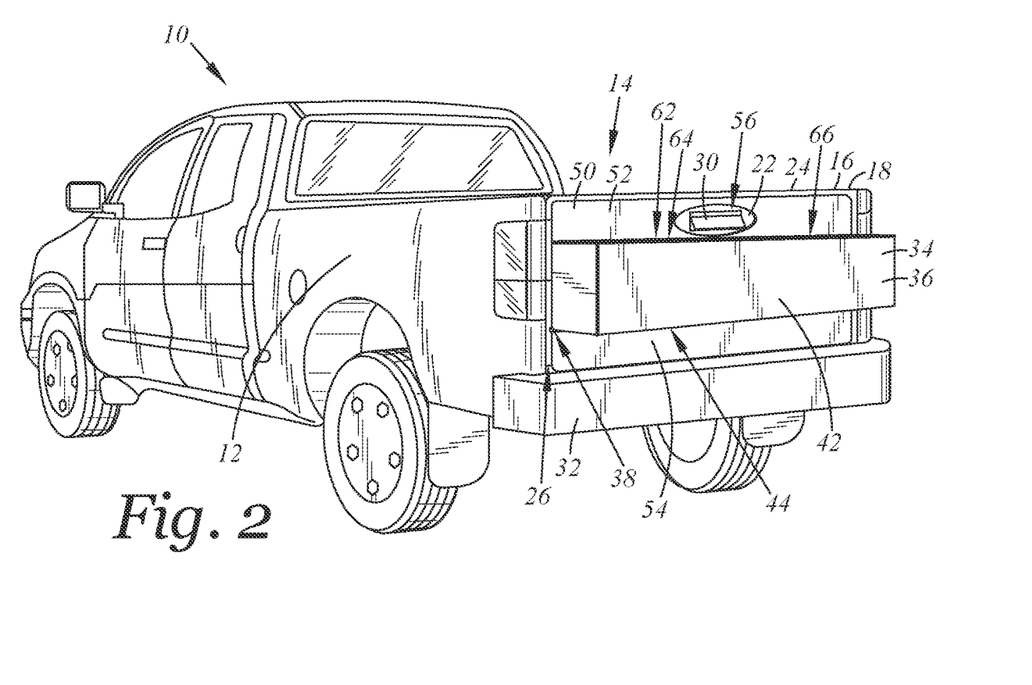
FIG. 2 is a perspective view of the vehicle of FIG. 1 with the storage carrier mounted upon the tailgate in a closed position and a cabinet in a stored position.
Figure 3:
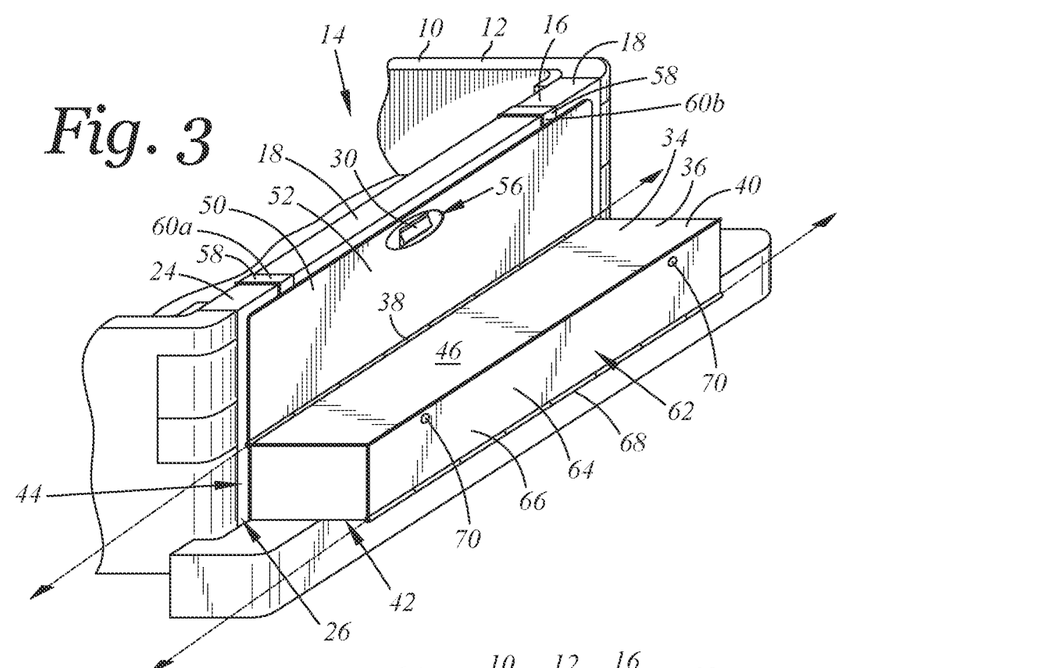
FIG. 3 is an enlarged perspective view of a portion of the vehicle of FIG. 2 with the tailgate in a closed position and the cabinet depicted in a deployed position.
Figure 4:
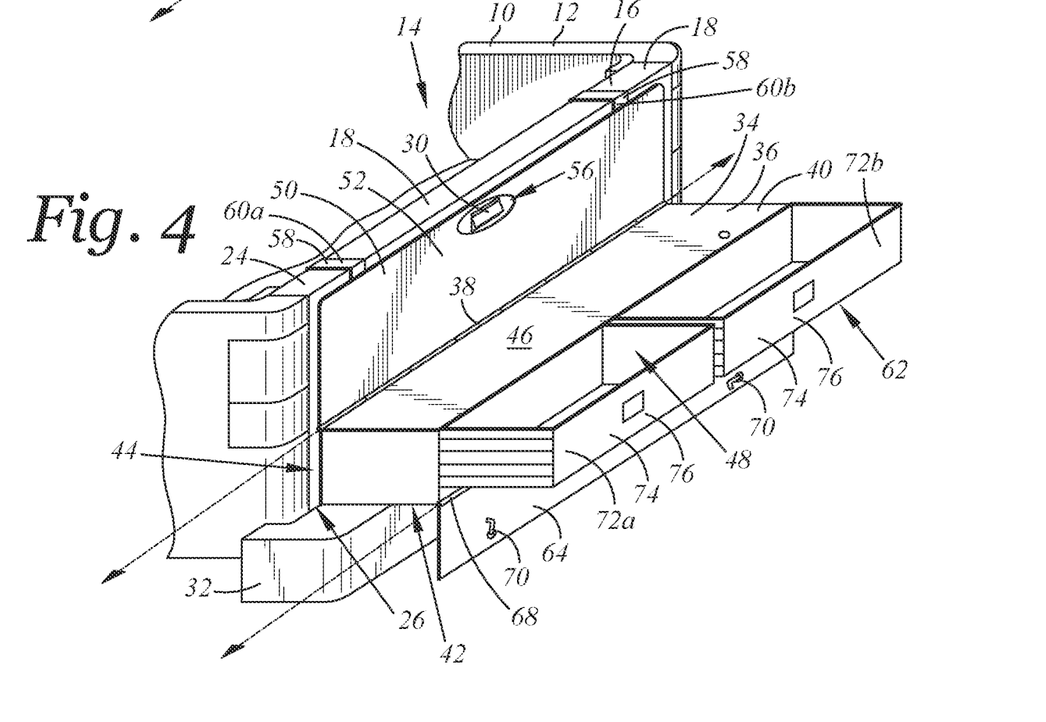
FIG. 4 is the enlarged perspective view of a portion of the vehicle of FIG. 3 with a cabinet lid in an open position and drawers in an open position.
Figure 5:
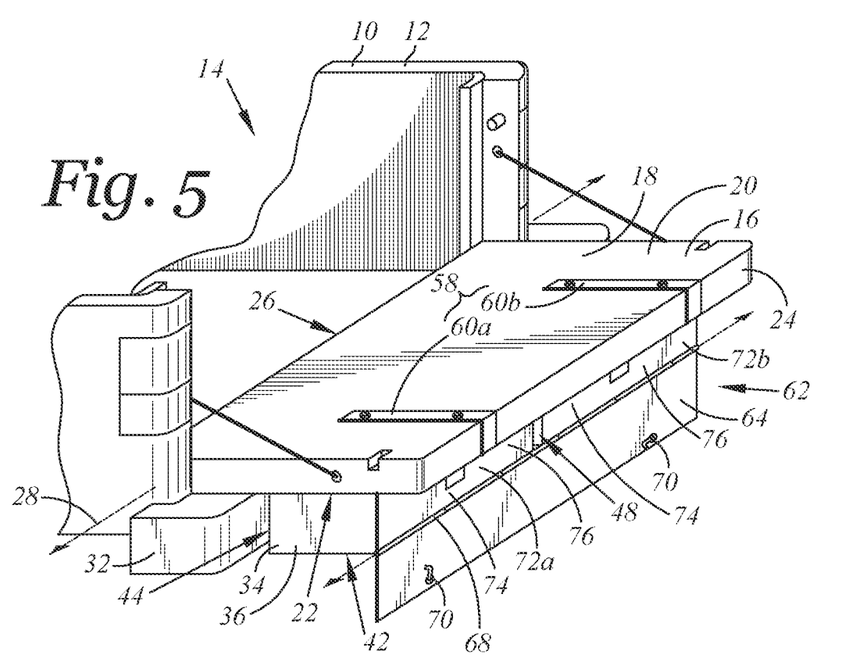
FIG. 5 is the enlarged perspective view of a portion of the vehicle of FIG. 4 with the tailgate in an open position, the cabinet in a closed position, the cabinet lid in an open position; and the drawers in a closed position.
Figure 6:
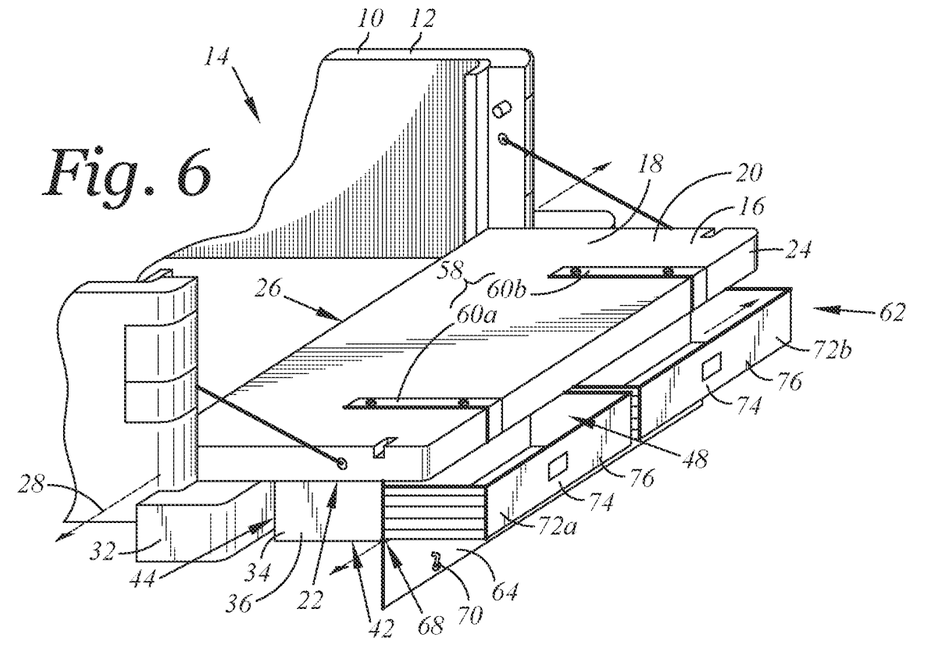
FIG. 6 is the enlarged perspective view of a portion of the vehicle of FIG. 5 with the drawers in an open position.

Referring additionally to FIG. 2 there is depicted the vehicle 10 of FIG. 1 with the storage carrier 34 according to an aspect of the present invention as discuss in detail below. The storage carrier 34 is mounted upon the tailgate 16 in a closed position. The storage carrier 34 includes cabinet 36 as depicted in a stored position. Referring additionally to FIGS. 3-6, there is depicted an enlarged perspective view of a portion of the vehicle 10 of FIG. 2 with the storage carrier 34. FIGS. 1-4 depict the tailgate 16 in the closed position. FIGS. 5-6 depict the tailgate in the open position.

The tailgate 16 includes an outer face 22 and an opposing inner face 20, and a top edge 24 disposed between the outer face 22 and the inner face 20 and an opposing bottom edge 26 disposed between the outer face 22 and the inner face 20. The tailgate 16 is pivotally connected to the vehicle body 12 generally along the bottom edge 26. The tailgate 16 has a closed position with the outer face 22 generally vertically oriented and facing away from the vehicle 10. The tailgate 16 has an open position with the outer face 22 generally horizontally oriented. The tailgate 16 pivots about an axis of rotation 28. In the embodiment depicted, the tailgate 16 includes a tailgate latch 30. The tailgate latch 30 is depicted as being centrally located generally towards the upper portion of the tailgate 16, as such location is a traditionally selection position for most vehicles. The vehicle 10 is further provided with a rear bumper 32.

The storage carrier 34 includes a hinge mechanism 38 sized and configured to be attachable to the outer face of the tailgate 16. The storage carrier 34 further includes the cabinet 36. The cabinet 36 includes a first side 40, a second side 42 opposite the first side 40, and a rear side 44 disposed between and generally orthogonal to the first and second sides 40, 42. The first side 40 has a resting surface 46 facing away from the cabinet 36. The cabinet 36 is attached to the hinge mechanism 38 adjacent the second and rear sides 42, 44.

The cabinet 36 is sized and configured to pivot between a stored position and a deployed position. FIGS. 2, 5 and 6 depict the cabinet 36 in the stored position. FIGS. 3 and 4 depict the cabinet 36 in the deployed position. In the stored position the first side 40 is disposed adjacent the outer face 22 and generally disposed in a vertical orientation with the tailgate 16 in a closed position and the hinge mechanism 38 attached to the outer face 22. In the deployed position the first side 40 is generally disposed in a horizontal orientation with the resting surface 46 being exposed away from the outer face 22 with the tailgate 16 in a closed position and the hinge mechanism 38 attached to the outer face 22. The storage carrier 34 further includes a cabinet recess 48 formed in the cabinet 36 and generally bounded by the first, second, and rear sides 46, 42, 44.

It is contemplated that the storage carrier 34 is configurable so that the contents of the storage carrier 34 can be easily accessed whether the tailgate 16 is in the closed position perpendicular to the ground or the tailgate is in the open position parallel to the ground. When the tailgate 16 is in the closed position perpendicular to the ground the storage carrier 34 the resting surface 46 functions as a working surface which adds tremendous utility and functionality to the vehicle 10. Further, the storage carrier 34 mounted on the outer face 22 (the rear side of the tailgate 16) does not interfere with the normal operating functionality of the vehicle 10 and only adds additional utility and functionality to the vehicle 10.

As mentioned above, in the stored position the first side 40 is generally disposed in a vertical orientation with the tailgate 16 in a closed position and the hinge mechanism 38 attached to the outer face 22. As used herein generally disposed in a vertical orientation refers to a position of being more upright than prone (as such, the first side 40 need not be perfectly at a 90 degree position with respect to the ground but may be sloped). Also as mentioned above, in the deployed position the first side 40 is generally disposed in a horizontal orientation with the tailgate 16 in a closed position and the hinge mechanism 38 attached to the outer face 22. As used herein generally disposed in a vertical orientation refers to a position of being more prone than upright (as such, the first side 40 need not be perfectly parallel to the ground but may be sloped).

According to various embodiments, the cabinet 36 may be attached to the hinge mechanism 38 adjacent the first side 40. In this regard, the hinge mechanism 38 may be disposed along the edge between the first side 40 and the rear side 44. The storage carrier 34 may further include a mounting plate 50. The mounting plate 50 may be attached to the hinge mechanism 38. The mounting plate 50 may be sized and configured to be attachable to the outer face 22 of the tailgate 16, and the hinge mechanism 38 may be attachable to the outer face 22 via the mounting plate 50.

The hinge mechanism 38 may be selected from any of those configurations, parts and components which are well known to one of ordinary skill in the art, and manufactured, assembled and installed according to any of those techniques which are well known to one of ordinary skill in the art. It is contemplated that the hinge mechanism 38 may be a discrete component that is attached to the mounting plate 50 and the cabinet 36 with fasteners. It is also contemplated that the hinge mechanism 38 may be formed with portions of the mounting plate 50 and the cabinet 36 that may interlock. One of ordinary still in the art would recognize that the hinge mechanism 38 functions to allow the cabinet 36 to pivot relative to the outer face 22 of the tailgate 16, and as such would be expected to be able to draw upon known components and techniques to readily facilitate such functionality. Further, design considerations would recognize that the hinge mechanism 38 may be subject to significant forces that may result during the process of moving the cabinet 36 (including any contents therein) between the stored and deployed positions and during vehicle operation.

In the stored position of the cabinet 36 the first side 40 may be disposed adjacent the outer face 22 when the mounting plate 50 is attached to the outer face 22. Mounting plate 50 may include an upper section 52 and a lower section 54 (as best seen in FIG. 2). In the stored position of the cabinet 36 the resting surface 46 may be against the mounting plate 50, and in particular the upper section 52. It is contemplated the that upper section 52 may protect the outer face 22 of the tailgate 16 from damage by impact from the first side 40 upon the cabinet 36 being moved to the stored position. Likewise, the lower section 54 may protect the outer face 22 from damage by impact from the rear side 44 upon the cabinet 36 being moved to the deployed position.

In addition, though not depicted, various bumpers or cushions distributed at strategic point may be used to absorb impacts and protect from damage the first side 40 and the upper section 52, such as rubber bumpers attached to either of the first side 40 or the upper section 52. Likewise, various bumpers or cushions may be used at interface of the rear side 44 and the lower section 54. In this regard, significant forces may result at such interface during the process of moving the cabinet 36 (including any contents therein) between the stored and deployed positions.

It is contemplated that the sizing of the cabinet 36 and the relative positioning of the cabinet 36 must consider the configuration of the bumper 32. In this regard, the vertical height of the lower section 54 (towards the hinge mechanism 38) would be proportional to the width of the rear side 44 between the first and second sides 40, 42 to ensure that the bumper 32 does not interfere with the pivoting of the cabinet 36 between the stored and deployed positions. Also, the distance which the bumper 32 extends rearward of the vehicle 10 must be considered when the tailgate 16 is in the open position and the cabinet 36 is in the stored position so that there is clearance by the rear side 44 and the extending bumper 32.

In the embodiment depicted in FIGS. 2-6, it contemplated that the storage carrier 34 would be implemented with a vehicle 10 having an existing tailgate 16. As such, it is understood that this embodiment would be implemented as an aftermarket product. When attaching the storage carrier to the tailgate 16 it is recognized that the outer face 22 may likely not be a perfectly flat and exactly vertical surface. As such, it is contemplated that various spacers and fittings, not shown, would be used to adjust the orientation of storage carrier 34 as well as ensure a secure mounting. Further it is contemplated that the mounting plate 50 may be contoured to accommodate specific tailgate designs associated with various vehicles.

The tailgate latch 30 is depicted as being centrally located generally towards the upper portion of the tailgate 16, as such location is a traditionally selection position for most vehicles. It is contemplated that the storage carrier 34 may be used with tailgate latch designs which are located at other positions about the tailgate 16, such as laterally off-centered, at the top edge 24 at the inner face 20 and at the outer face 22 towards the bottom edge 26. In the embodiment depicted, in order to allow for ready access to the tailgate 30 when the storage carrier 34 is installed, the mounting plate 50 may include an opening 56.

The storage carrier 32 may further include an attachment portion 58 that is connected to of the mounting plate 50 and positionable over the top edge 24 of the tailgate 16 when the mounting plate 50 is attached to the outer face 22. In the embodiment of FIGS. 2-6, the attachment portion 58 includes a pair of attachment arms 60a,b. The attachment arms 60a,b extend from the upper section 52 of the mounting plate 50 over the top edge 24 and down along the inner face 20. Fasteners may be used to affix the attachment arms 60a,b to the tailgate body 18 at the inner face 20. One of ordinary skill in the art would recognize that the attachment portion 58, including the attachment arms 60a,b, may be configured to be adjustable so as to facilitate various thicknesses of a tailgate. In addition, various spacers (not shown) may be used to adjust for the secure mounting and attachment of the storage carrier 34 to the tailgate 16.

The cabinet 36 may have a front side 62 opposite the rear side 44. In the embodiment of FIGS. 2-6, the front side 62 is open to the cabinet recess 48. In this regard a cabinet lid 64 may be provided. The cabinet lid 64 is depicted as being closed in FIGS. 2 and 3, and as being open in FIGS. 4-6. The cabinet lid 64 may also define a working surface 66. With the tailgate in the closed position, the cabinet in the stored position, and the cabinet lid 64 in the closed position, the working surface 66 is disposed in a generally horizontal orientation. It is contemplated such working surface 66 presents the user with additional functionality of the storage carrier 34 with the benefits of having the availability of such horizontal surface. In this regard, with the tailgate 16 in a closed position, the user always has availability of a horizontal surface (either the working surface 66 when the cabinet 36 is in the stored position, or the resting surface 46 when the cabinet 36 is in the deployed position). Such full functionality is contemplated to add significant utility to the storage carrier 34, well beyond merely being a carrier of cargo.

The cabinet lid 64 may be hingedly attached to the cabinet 36, through the use of hinge 68 disposed along the second side 42. While the cabinet lid 64 may be attached in a variety of ways, having such attachment configuration allows for the cabinet lid 64 to simply hang down and leave open or exposed the cabinet recess 48 with the tailgate in the open position and the cabinet in the stored position. This allow for ready access to the cabinet recess 48. The cabinet lid 64 being disposed at the front side 62 is contemplated to allow for access to the cabinet recess 68 regardless of the positioning of the tailgate being in the open or closed positions and the cabinet 36 being in the stored or deployed positions. The cabinet lid 64 may be securely engaged with the rest of the cabinet 36 through the use of a locking latch 70 that is configured to engage the complementary components disposed in the cabinet lid 64 and adjacent first side 40 of the cabinet 36.

As mentioned above, the cabinet 36 includes a cabinet recess 48. The cabinet recess 48 may include one or more compartments. In the embodiment of FIGS. 2-6, the cabinet recess 48 includes a single large recess, and there are provided a pair of drawers. 72a, b. A single drawer or more than two drawers may be provided. Each drawer 72a,b may have front panel 74 with a front surface 76 facing away from the drawer 72a,b. Each drawer 72a,b may be positionable within the cabinet recess 48 and sized and configured to slide into and out of the cabinet recess 48. The front surface 76 may be generally disposed in a horizontal orientation with the tailgate 16 in a closed position and the cabinet 36 in a stored position. Each drawer 72a,b may be sized and configured to slide into and out of the cabinet recess 48. In this embodiment of FIGS. 2-6, each drawer 72a,b is sized and configured to slide into and out of the cabinet recess 48 in directions towards and away from the rear side 44.

The carrier container 34 is preferably metal, such as aluminum, but may be made of any other sturdy, durable material, including certain plastics, as well as a combination of various materials for the various component parts.

Referring now to FIGS. 7-10, there is depicted a storage carrier 78 according to another embodiment. The storage carrier 78 is similar to the storage carrier 34, however, with the differences noted. In this regard, like reference number indicate like components and/or functionality as would be understood by one of ordinary still in the art. In this regards, components of a given embodiment by be utilized in another embodiment within the scope of the present discussion.

Figure 7:
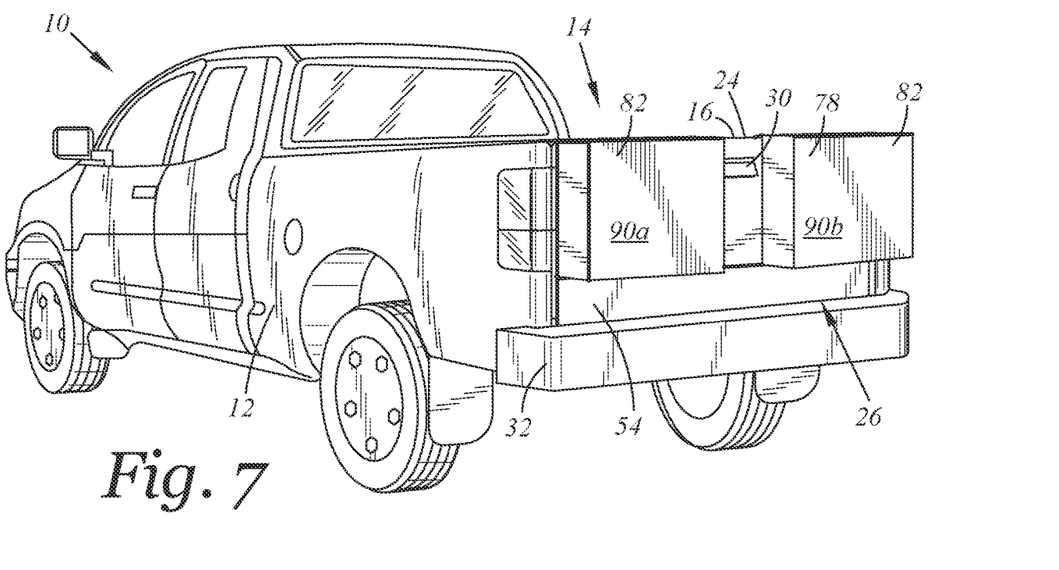
FIG. 7 is a perspective view of the vehicle of FIG. 1 with a storage carrier according to another embodiment with two cabinets.
Figure 8:
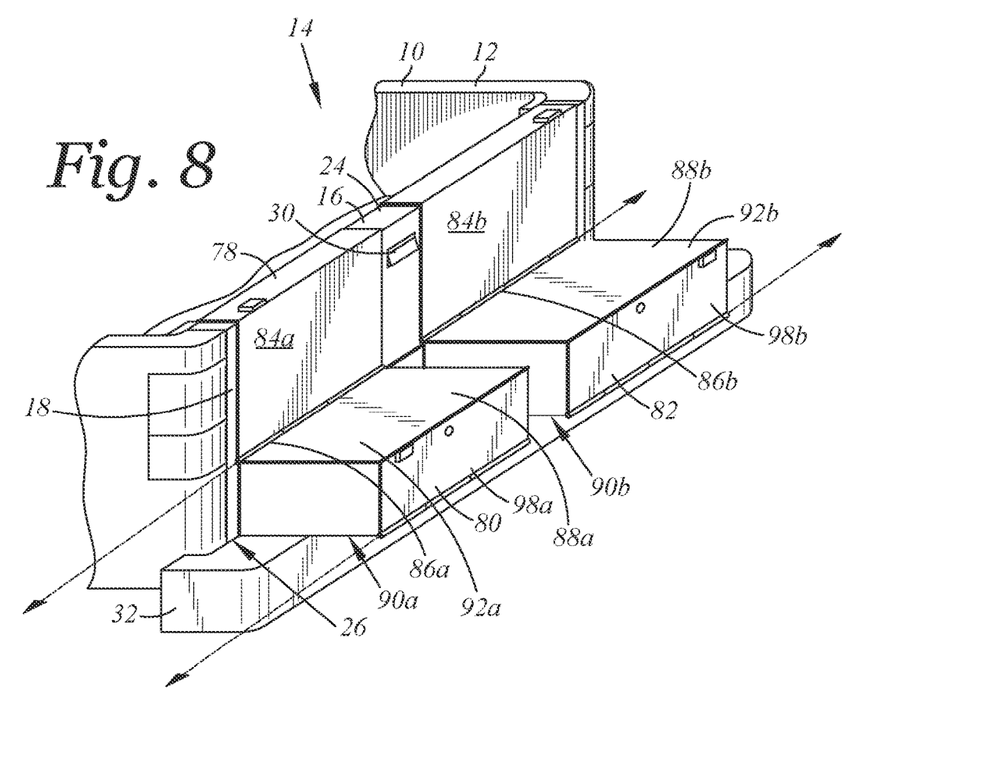
FIG. 8 is an enlarged perspective view of a portion of the vehicle of FIG. 7 with the tailgate in a closed position and the cabinets depicted in a deployed position.
Figure 9:
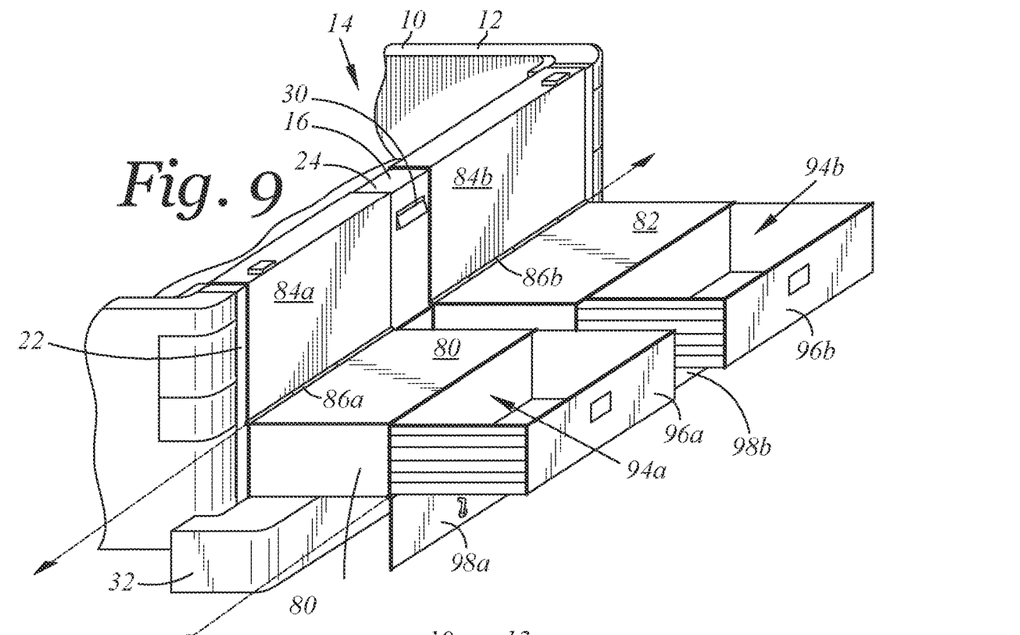
FIG. 9 is the enlarged perspective view of a portion of the vehicle of FIG. 8 with cabinet lids in an open position and drawers in an open position.
Figure 10:
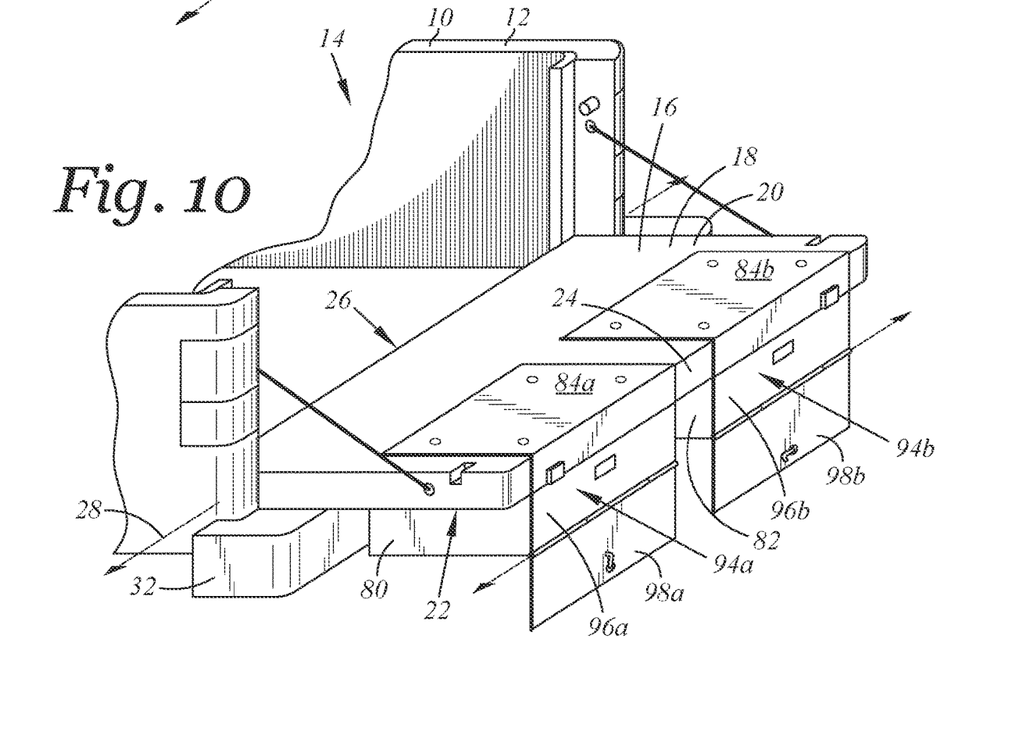
FIG. 10 is the enlarged perspective view of a portion of the vehicle of FIG. 9 with the tailgate in an open position, the cabinets in a closed position, the cabinet lids in an open position; and the drawers in a closed position.

FIG. 7 is a perspective view of the vehicle 10 of FIG. 1 with the storage carrier 78 according to another embodiment. The storage carrier 78 includes two cabinets 80, 82. FIG. 7 depicts the tailgate 16 is in a closed position and the cabinets 80,82 are in a stored position. FIG. 8 is an enlarged perspective view of a portion of the vehicle 10 of FIG. 7 with the tailgate 16 in a closed position and the cabinets 80, 82 depicted in a deployed position;

The storage carrier 34 of this embodiment facilitates access to the centrally positioned tailgate latch 30 by utilizing the two cabinets 80, 82 that are laterally disposed on either side of the tailgate latch 30. This arrangement is contemplated to allow for the cabinets 80, 82 to extend vertically (when the tailgate 16 is in the closed position and the cabinets 80, 82 are in the stored position) towards the top edge 24 above the tailgate latch 30. The storage carrier 78 includes upper sections 84a,b that extend from hinges 86a,b.

When installed along the outer face 22 of the tailgate 16, the upper section 82a,b further extend over the top edge 24 and along the inner face 20. The cabinets 80a,b each respectively has a first face 88a,b and an opposing second face 90a,b. The first faces 88a,b each respectively has a resting surface 92a,b. The cabinets 80a,b each respectively has a cabinet recess 48a,b that houses a drawer 94a,b and is enclosed by a cabinet lid 96a,b.

Figure 11:
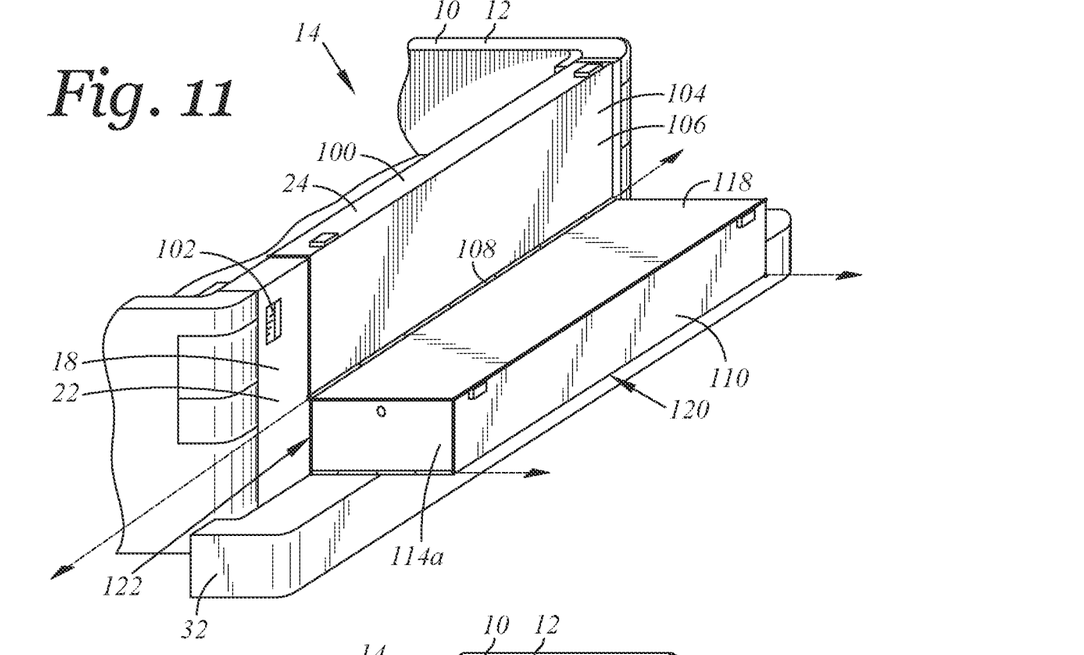
FIG. 11 is an enlarged perspective view of a portion of the vehicle of FIG. 1, however, with a different tailgate having a tailgate latch disposed at an upper left position and with a storage carrier according to another embodiment with a cabinet in a deployed position.
Figure 12:
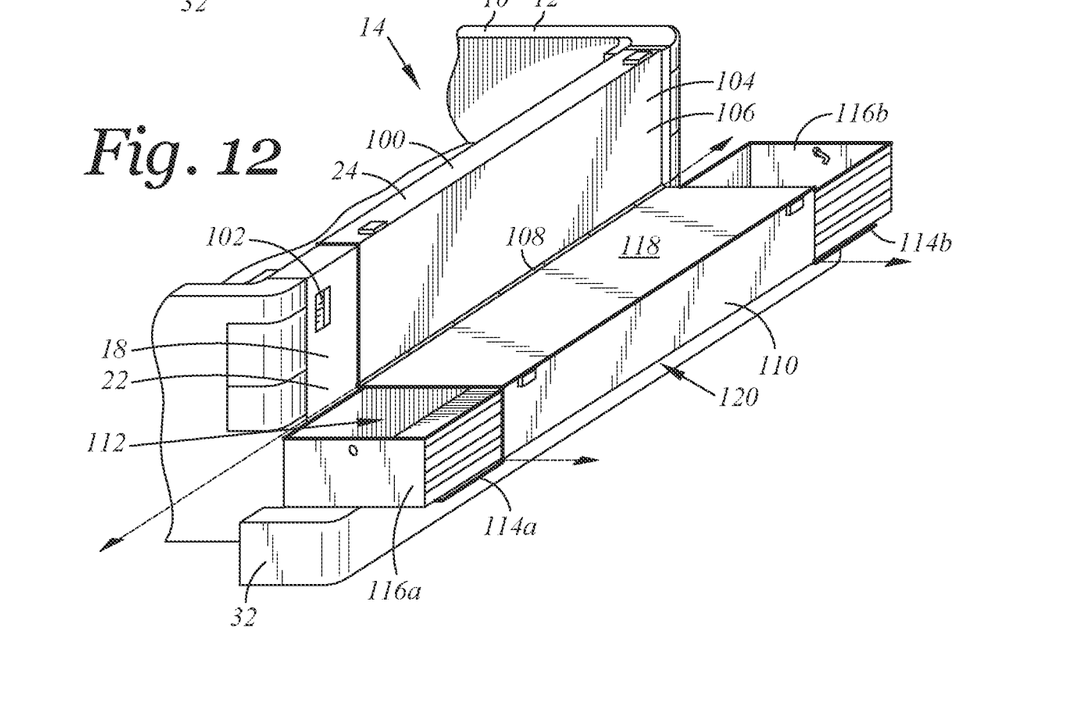
FIG. 12 is the enlarged perspective view of a portion of the vehicle of FIG. 11 with cabinet lids in an open position and draws in an open position.

Referring now to FIGS. 11-12, there is depicted a tailgate 100 according to another embodiment. The tailgate 100 is similar to the tailgate 16 and the storage carrier 34, however, with the differences noted. In this regard, this embodiment combines features of the tailgate 16 with those of the storage carrier 34 in a more integrated manner. In this regard, like reference number indicate like components and/or functionality as would be understood by one of ordinary still in the art. In this regards, components of a given embodiment by be utilized in another embodiment within the scope of the present discussion. In this embodiment, it is contemplated that there is provided a tailgate 100 that is generally similar to the tailgate 16. In this embodiment the tailgate 100 has a tailgate latch 102 that is located laterally off-center to the left. The tailgate 100 has a tailgate body 104 with an outer face 106. A hinge 108 integrally attaches a cabinet 110 to the outer face 106. In this regard, it is contemplated that this embodiment may be commercially implemented by offering the tailgate 100 as an aftermarket part that is intended to replace an existing traditional tailgate. The cabinet 110 may include a cabinet recess 112 that is accessed laterally. Each end of the cabinet may respectively have a cabinet lid 114a,b. A pair of drawers 116a,b may be provided that are disposed in the cabinet recess 112. The cabinet 110 includes a first face 118 and an opposing second face 120, and a rear face 122 between the first and second faces 118, 120. The drawers 116a,b may be sized and configured to slide into and out of the cabinet recess 1112 in directions parallel the rear side 122. This would provide lateral access to the cabinet recess 112 with respect to overall vehicle 10.

Figure 13:
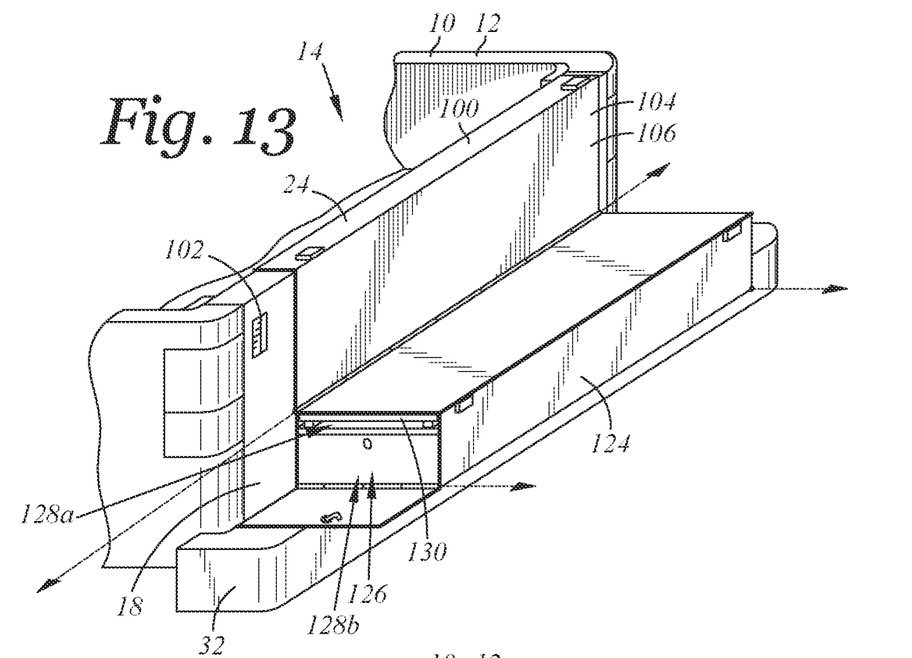
FIG. 13 is an enlarged perspective view of a portion of the vehicle of FIG. 1, however, with a different tailgate having a tailgate latch disposed at an upper left position and with a storage carrier according to another embodiment with a cabinet in a deployed position and a cabinet lid in an open position.
Figure 14:
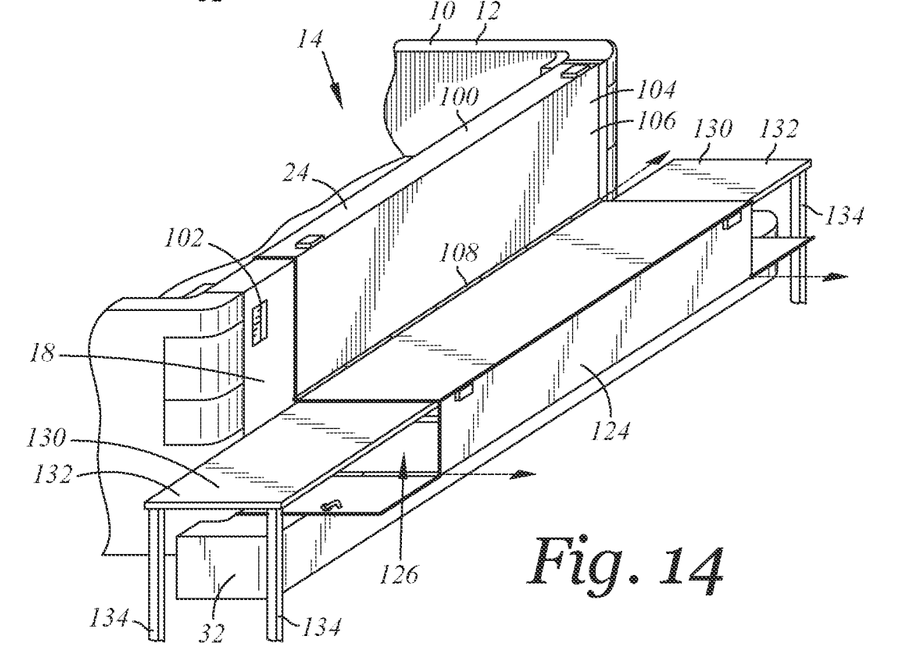
FIG. 14 is the enlarged perspective view of a portion of the vehicle of FIG. 13 with table panel in extended positions.
Figure 15:
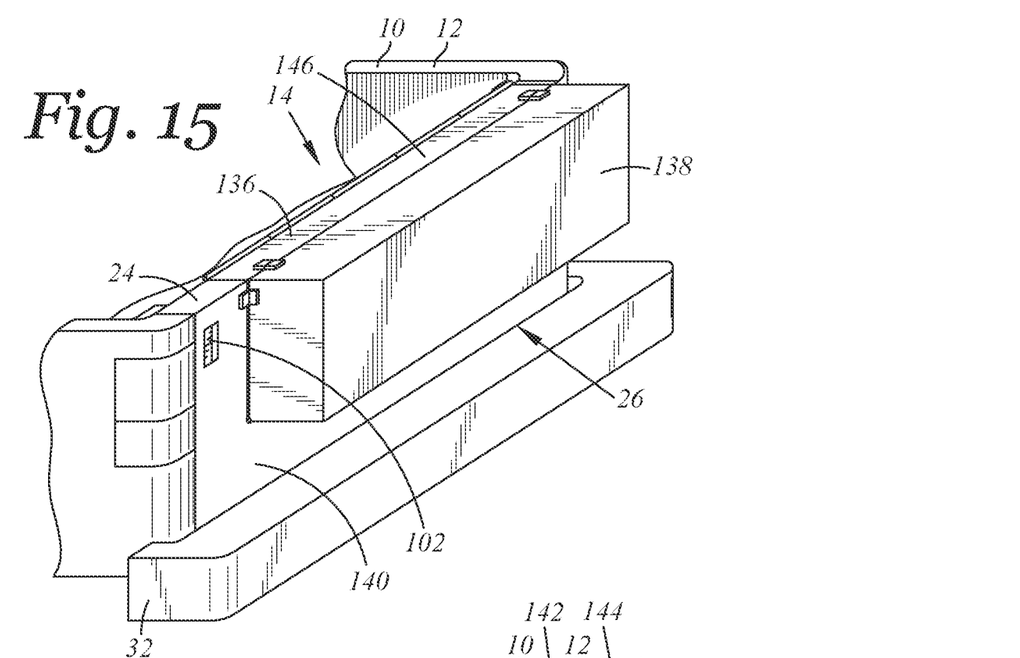
FIG. 15 is an enlarged perspective view of a portion of the vehicle of FIG. 1, however, with a different tailgate having a tailgate latch disposed at an upper left position and with the tailgate in a closed position, a tailgate lid in a closed position, a storage carrier according to another embodiment with a cabinet in a stored position and a cabinet lid in a closed position.

Referring now to FIGS. 13 and 14, there is depicted the tailgate 100, however, with a cabinet 124. The cabinet 124 features a cabinet recess 126 that includes more than one compartment, compartments 128a,b. Compartment 128a is an upper compartment and 128b is a lower compartment (in the view of FIG. 13). The cabinet 124 may include table panels 130a,b each having a working surface 132. The table panels 130a,b are each positionable within the cabinet recess 126. Each table panel 130a,b may be sized and configured to slide into and out of the cabinet recess 126 with the working surface 132 being generally disposed in a horizontal orientation with the tailgate 100 in a closed position and the cabinet in the deployed position. Each table panel 130a,b may have extendable legs 134. They may be foldable, telescoping or otherwise attachable. It is understood that the tailgate 100 may be disposed in a open position with the cabinet in a closed position and this configuration would still allow for the table panels to be extended with the working surfaces 132 in a horizontal orientation.

Figure 16:
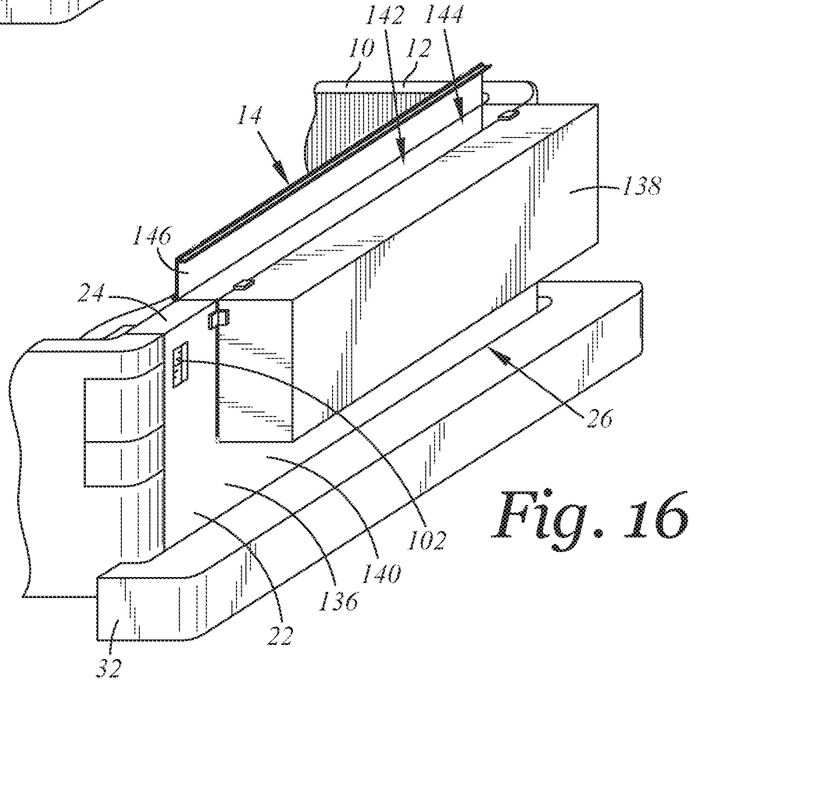
FIG. 16 is the enlarged perspective view of a portion of the vehicle of FIG. 15 with the tailgate lid in an open position.
Figure 17:
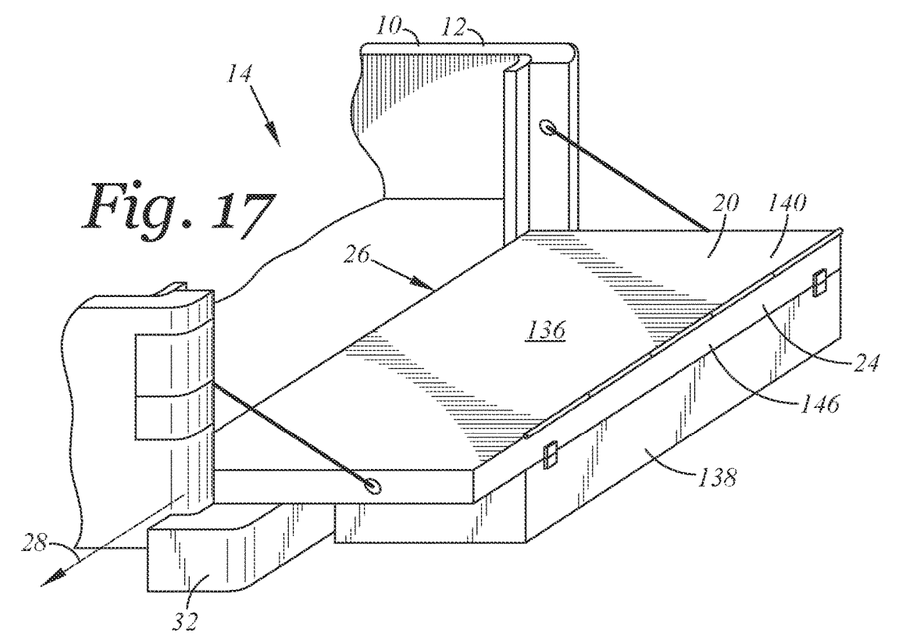
FIG. 17 is the enlarged perspective view of a portion of the vehicle of FIG. 16 with the tailgate in an open position.
Figure 18:
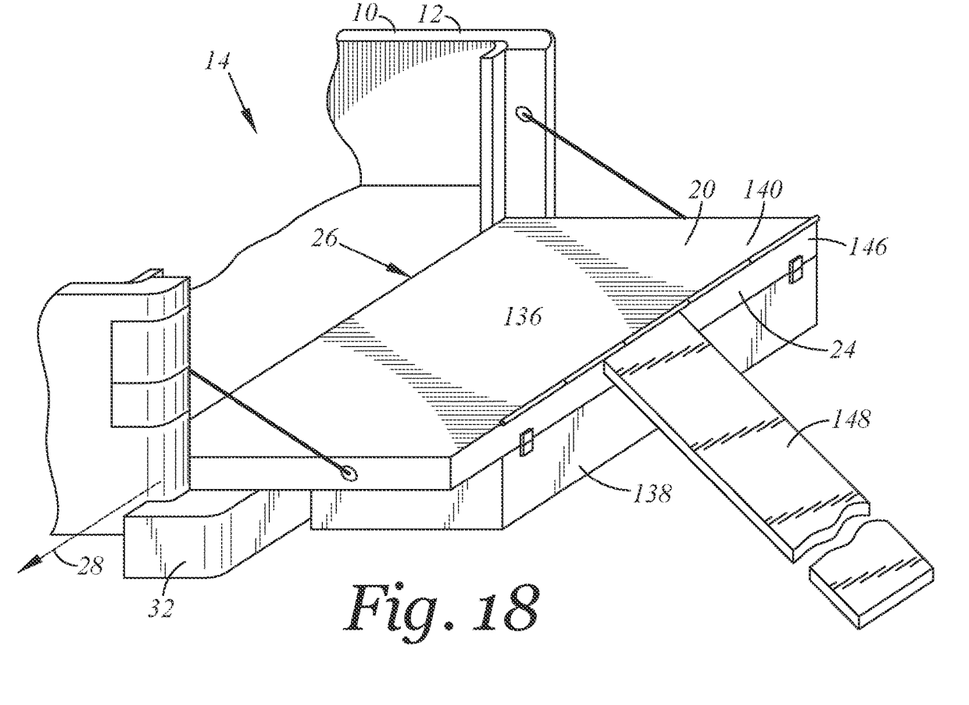
FIG. 18 is the enlarged perspective view of a portion of the vehicle of FIG. 17 with a ramp positioned upon the tailgate.

Referring now to FIGS. 16-18, there is depicted a tailgate 136 according to another embodiment. The tailgate 136 is similar to tailgate 100, however, with the differences noted. The tailgate 136 includes a cabinet 138. Cabinet 138 is similar to any of those cabinets 124, 110 such as discuss above. As depicted in FIG. 1 The tailgate 136 has a tailgate body 140 that includes a tailgate storage recess 142 formed in the tailgate body 140 and generally bounded by the outer face 22, the inner face 20, the top edge 24 and the bottom edge 26. The tailgate body 140 may further include has a tailgate opening 144 adjacent the top edge 24 and extending to the tailgate storage recess 142. The tailgate body 140 may include a tailgate lid 146 disposed adjacent the top edge 24 sized and configured to extend across the tailgate opening 144 between the inner face 20 and the outer face 22 with the tailgate lid 146 in a closed position for enclosing the tailgate storage recess 142.

The tailgate 136 may include a ramp 148 positionable in the tailgate storage recess 142. With reference to FIG. 18, the ramp 148 may be sized and configured to be extendable between the tailgate 136 in the open position and a ground surface upon which a vehicle 10 of the vehicle body 12 is resting upon. In order to lessen the need for lifting cargo, the ramp will allow the easier movement of cargo into and out of the cargo bed 14 the vehicle 10. The ramp 148 provides a connection of the cargo bed 14 to the ground. When fully deployed, the ramp 148 has a length that reaches the top edge 24 of the tailgate 136 from the ground at an acceptable angle. The ramp 148 may be foldable, telescoping, or otherwise collapsible so that it may be safely stored.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice. It is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A storage carrier for use with a tailgate of a vehicle, the tailgate including an outer face and an opposing inner face, and a top edge disposed between the outer face and the inner face and an opposing bottom edge disposed between the outer face and the inner face, the tailgate being pivotally connected to a vehicle body generally along the bottom edge, the tailgate having a closed position with the outer face generally vertically oriented and facing away from the vehicle, the tailgate having an open position with the outer face generally horizontally oriented, the storage carrier comprising:

a hinge mechanism sized and configured to be attachable to the outer face of the tailgate;

a cabinet including a first side, a second side opposite the first side, and a rear side disposed between and generally orthogonal to the first and second sides, the first side having a resting surface facing away from the cabinet, the cabinet being attached to the hinge mechanism at the intersection of the first and rear sides, the cabinet being sized and configured to pivot between a stored position and a deployed position, in the stored position the first side being disposed adjacent the outer face and generally disposed in a vertical orientation with the tailgate in a closed position and the hinge mechanism attached to the outer face, in the deployed position the first side being rotated downwardly and generally disposed in a horizontal orientation with the resting surface being exposed away from the outer face with the tailgate in a closed position and the hinge mechanism attached to the outer face; and a cabinet recess formed in the cabinet and generally bounded by the first, second, and rear sides.

2. The storage carrier of claim 1 further includes a mounting plate attached to the hinge mechanism, the mounting plate is sized and configured to be attachable to the outer face of the tailgate, the hinge mechanism is attachable to the outer face via the mounting plate.

3. The storage carrier of claim 2 wherein in the stored position the first side is disposed adjacent the outer face when the mounting plate is attached to the outer face.

4. The storage carrier of claim 2 wherein in the stored position the resting surface is against the mounting plate.

5. The storage carrier of claim 1 further includes an attachment portion, the attachment portion is connected to the mounting plate and positionable over the top edge of the tailgate when the mounting plate is attached to the outer face.

6. The storage carrier of claim 1 further includes a drawer having a front panel with a front surface facing away from the drawer, the drawer is positionable within the cabinet recess and sized and configured to slide into and out of the cabinet recess, the front surface being generally disposed in a horizontal orientation with the tailgate in a closed position.

7. The storage carrier of claim 6 wherein the drawer is sized and configured to slide into and out of the cabinet recess, the front surface being generally disposed in a horizontal orientation with the tailgate in a closed position.

8. The storage carrier of claim 6 wherein the drawer is sized and configured to slide into and out of the cabinet recess in directions towards and away from the rear side.

9. The storage carrier of claim 6 wherein the drawer is sized and configured to slide into and out of the cabinet recess in directions parallel the rear side.

10. The storage carrier of claim 1 wherein the cabinet includes a third side and a fourth opposite the third side, the third and fourth sides being orthogonal to the first, second and rear sides.

11. The storage carrier of claim 1 wherein the cabinet further includes a lid disposed opposite the rear side attachable at the first and second sides for enclosing the cabinet recess.

12. The storage carrier of claim 1 wherein the cabinet recess defines a single compartment.

13. The storage carrier of claim 1 wherein the cabinet recess defines more than one compartment.

14. The storage carrier of claim 1 further includes a table panel having a working surface, the table panel is positionable within the cabinet recess, the table panel is sized and configured to slide into and out of the cabinet recess with the working surface being generally disposed in a horizontal orientation with the tailgate in a closed position and the cabinet in the deployed position, the table panel is sized and configured to slide into and out of the cabinet recess with the working surface being generally disposed in a horizontal orientation with the tailgate in the open position and the cabinet in the closed position.

15. A tailgate for use with a vehicle body, the tailgate comprising:

tailgate body having an outer face and an opposing inner face, a top edge disposed between the outer face and the inner face, and a bottom edge disposed opposite the top edge and disposed between the outer face and the inner face, the tailgate body being pivotally connectable to the vehicle body generally along the bottom edge, the tailgate having a closed position with the outer face generally vertically oriented and facing away from the vehicle when the tailgate being pivotally connected to the vehicle body, the tailgate having an open position with the outer face generally horizontally oriented when the tailgate being pivotally connected to the vehicle body;

a hinge mechanism disposed along the outer face of the tailgate;

a cabinet including a first side, a second side opposite the first side, and a rear side disposed between and generally orthogonal to the first and second sides, the first side having a resting surface facing away from the cabinet, the cabinet being attached to the hinge mechanism at the intersection of the first and rear sides, the cabinet being sized and configured to pivot between a stored position and a deployed position, in the stored position the first side being rotated downwardly and generally disposed adjacent the outer face and generally disposed in a vertical orientation with the tailgate in a closed position, in the deployed position the first side being generally disposed in a horizontal orientation with the resting surface being exposed away from the outer face with the tailgate in a closed position; and a cabinet recess formed in the cabinet and generally bounded by the first, second, and rear sides.

16. The tailgate of claim 15 wherein the tailgate body includes a tailgate storage recess formed in the tailgate body and generally bounded by the outer face, the inner face, the top edge and the bottom edge, the tailgate body further includes has a tailgate opening adjacent the top edge and extending to the tailgate storage recess.

17. The tailgate of claim 16 wherein the tailgate body includes a tailgate lid disposed adjacent the top edge sized and configured to extend across the tailgate opening between the inner face and the outer face with the lid in a closed position for enclosing the tailgate storage recess.

18. The tailgate of claim 16 wherein the tailgate body includes a tailgate lid disposed adjacent the top edge sized and configured to extend across the tailgate opening from the inner to adjacent the second side with the tailgate lid in the closed position and the and cabinet in the stored position for enclosing the tailgate storage recess.

19. The tailgate of claim 15 wherein the tailgate includes a ramp positionable in the tailgate storage recess, the ramp being sized and configured to be extendable between the tailgate in the open position and a ground surface upon which a vehicle of the vehicle body is resting upon.

* * * * *